(12) United States Patent
Pfeifle (10) Patent No.: US 9,709,407 B2
(45) Date of Patent: Jul. 18, 2017

(54) METHOD AND APPARATUS FOR USE IN NAVIGATIONAL APPLICATIONS

(71) Applicant: HERE Global B.V., Eindhoven (NL)

(72) Inventor: Martin Pfeifle, Seewald (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/655,453

(22) PCT Filed: Jan. 30, 2013

(86) PCT No.: PCT/IB2013/050792
§ 371 (c)(1),
(2) Date: Jun. 25, 2015

(87) PCT Pub. No.: WO2014/118593
PCT Pub. Date: Aug. 7, 2014

(65) Prior Publication Data
US 2015/0354971 A1  Dec. 10, 2015

(51) Int. Cl.
*G08G 1/123* (2006.01)
*G01C 21/26* (2006.01)
*G01C 21/32* (2006.01)
*G06F 17/30* (2006.01)

(52) U.S. Cl.
CPC .............. *G01C 21/26* (2013.01); *G01C 21/32* (2013.01); *G06F 17/30* (2013.01)

(58) Field of Classification Search
CPC .......... G01C 21/26; G01C 21/32; G06F 17/30
See application file for complete search history.

(56) References Cited

U.S. PATENT DOCUMENTS

| 6,546,334 | B1 | 4/2003 | Fukuchi et al. |
| 2002/0004701 | A1 | 1/2002 | Nakano |
| 2004/0125989 | A1 | 7/2004 | Kimura |
| 2004/0133343 | A1* | 7/2004 | Hashida ................. G01C 21/32 700/208 |
| 2005/0058155 | A1* | 3/2005 | Mikuriya ............ H04Q 3/0062 370/474 |

(Continued)

FOREIGN PATENT DOCUMENTS

| CN | 1576795 A | 2/2005 |
| CN | 1924523 A | 3/2007 |

(Continued)

OTHER PUBLICATIONS

International Search Report and Written Opinion received for corresponding Patent Cooperation Treaty Application No. PCT/IB2013/050792, dated Apr. 12, 2013, 16 pages.

(Continued)

*Primary Examiner* — Mary Cheung
(74) *Attorney, Agent, or Firm* — Alston & Bird LLP (57) ABSTRACT

A method comprising providing or receiving updated information, the previous and said updated information associated with a geographic region, said previous information comprising information about one or more links usable for connecting to one or more links in a different geographic region, and said updated information comprising at least said previous information and new information about one or more links for connecting to one or more links in said different geographic region.

19 Claims, 9 Drawing Sheets

(56) References Cited

U.S. PATENT DOCUMENTS

| 2006/0074547 | A1  | 4/2006  | Kaufman et al. |               |
|--------------|-----|---------|----------------|---------------|
| 2007/0093960 | A1* | 4/2007  | Atarashi       | G01C 21/32    |
|              |     |         |                | 701/450       |
| 2007/0213929 | A1  | 9/2007  | Tanizaki et al.|               |
| 2007/0266055 | A1* | 11/2007 | Nomura         | G01C 21/32    |
| 2007/0282524 | A1* | 12/2007 | Tanizaki       | G09B 29/10    |
|              |     |         |                | 340/995.12    |
| 2009/0005971 | A1* | 1/2009  | Otsuki         | G01C 21/32    |
|              |     |         |                | 701/532       |
| 2010/0225651 | A1  | 9/2010  | Nomura         |               |
| 2011/0179080 | A1* | 7/2011  | Miyazaki       | G06F 17/30241 |
|              |     |         |                | 707/772       |
| 2013/0117322 | A1  | 5/2013  | Fischer et al. |               |
| 2013/0238648 | A1* | 9/2013  | Fujiwara       | G01C 21/32    |
|              |     |         |                | 707/758       |

FOREIGN PATENT DOCUMENTS

| EP | 2267411 X1      | 12/2010 |
| EP | 2452158 A       | 5/2012  |
| JP | 2002 116689 A   | 4/2002  |
| JP | 2005 003700 A   | 1/2005  |
| JP | 2009 008704 A   | 1/2009  |
| JP | 2012 155286 A   | 8/2012  |
| WO | WO-2011/004029 A2 | 1/2011 |

OTHER PUBLICATIONS

Office Action for Japanese Application No. 2015-554260 dated Aug. 24, 2015.

Berrettini, Emanuele et al. "Arc-Flags in Dynamic Graphs." 9th Workshop on Algorithmic Approaches for Transportation Modeling, Optimization, and Systems, ATMOS, 2009, 18 pages.

Daniel Patrascu. "BMW Real-Time Traffic Information Explained—autoevolution." Autoevolution.com, Jan. 31, 2011, [online] [retrieved Nov. 7, 2016] Retrieved from the Internet, URL: <http://www.autoevolution.com/news/bmw-real-time-traffic-information-explained-30487.html>, 4 pages.

Delling D. "Engineering and Augementing Route Planning Algorithms " Dissertation—Zur Erlangung Des Akademischen Grades Eines Doktors Der Naturwissenschaften Der Fakult At Fur Informatik Der Universit At Fridericiana Zu Karlsruhe (TH) Genehmigte, University Karlsruh, Feb. 10, 2009, XP002612394, [online] [retrieved Jan. 7, 2016], Retrieved from the Internet, URL: <http://digbib.ubka.uni-karlsruhe.de/volltexte/documents/765585>, 162 pages.

European Search Report for European Patent Application No. 13873901.6 dated Oct. 6, 2016, 11 pages.

Search Report for corresponding Chinese Patent Application No. 2013800717431 dated Feb. 23, 2017, 1 page.

Office Action for corresponding Chinese Patent Application No. 201380071743.1 dated Mar. 3, 2017, with English translation, 10 pages.

* cited by examiner

METHOD AND APPARATUS FOR USE IN NAVIGATIONAL APPLICATIONS

CROSS-REFERENCE TO RELATED APPLICATIONS

This application is a National Stage Entry of and claims priority to Patent Cooperation Treaty Application No. PCT/IB2013/050792 filed Jan. 30, 2013.

BACKGROUND OF THE INVENTION

Some embodiments relate to a method of and apparatus and in particular, but not exclusively for use in navigation applications. Some embodiments may also relate to navigation databases.

Many devices are capable of providing navigation functions. By way of example, these devices may be dedicated devices for this purpose. The dedicated devices may be portable or may be incorporated in for example a vehicle. Navigation devices may also be provided in user equipment such as mobile phones.

These devices require access to a navigational database. The navigational database may be included in the device itself. Alternatively, the database may be provided in a server with which the navigation device communicates. In the latter case, the communication with the database may be for example via a radio interface and/or a core network.

Such navigation databases may require to be updated for example to take into account the providing of new roads or changes to existing roads. Such databases are used to compute suitable routes between a starting point and an endpoint.

NDS (Navigational Data Standard) is a registered association that develops a standardised Physical Storage Format (PSF) for maps in navigation systems. At present, a variety of different update media and several update mechanisms are available for in-car systems or mobile clients. NDS may provide a harmonised format for different systems, and flexibility regarding map composing and map updates.

BRIEF SUMMARY OF THE INVENTION

According to an aspect, there is provided a method comprising: providing or receiving updated information, previous and said updated information associated with a geographic region, said previous information comprising information about one or more links usable for connecting to one or more links in a different geographic region, and said updated information comprising at least said previous information and new information about one or more links for connecting to one or more links in said different geographic region.

The providing may comprise computing a rank for each link of said geographic region usable for connecting to one or more links of said different geographic region, determining for said each link if said computed rank has a lower importance than a previous computed rank for said link and if so, retaining the previous computed rank as the rank for said link.

The method may comprise storing said updated information for said geographic region in association with map information for said geographic region.

A geographic area may be divided into at least said geographic region and said different geographic region, wherein said geographic region and said different geographic region are adjacent to each other and each of said geographic region and said different geographic region comprise at least one respective link usable to form a route between a first location in said geographic region and a second location in said different geographic region.

The method may comprise using said updated information when determining a route between said geographic region and said different region or between a first location in said geographic region and a second location in said different region.

The new information may be in respect of one or more links different to those of said previous information and/or one or more links of the previous information where said one or more links of the previous information has changed.

The previous and updated information may comprise edge flag information.

The previous information and said updated information may comprise a vector indicating if said link is a desired path to a respective node of respective partitions of a region.

The previous information may comprise a previous vector and said updated information may comprise an updated vector, each value of said updated vector being one of the same or changed with respect to said previous vector to a value representing a higher ranking.

The previous information and said updated information may comprise link hierarchy information.

The updated information may be in a first link level and said previous information may be retained in said first link level.

Each of said links may have a link class associated therewith.

The method may comprise applying a cost function to one or more of said links.

The cost function may be dependent on one or more of length associated with said link, speed associated with said link and one or more attributes of said link.

The one or more attributes may comprise one or more of tunnel and bridge.

The method may comprise storing said previous information, compiling update region information for said region when said update region information has been updated and storing first information associated with said compilation; and providing said updated information from said previous information and said first information.

The method may comprise carrying out an OR operation in respect of said previous and first information to provide said updated information.

The updated information may comprise said previous information and said first information.

According to an aspect, there is provided an apparatus comprising means for providing or receiving updated information, previous and said updated information associated with a geographic region, said previous information comprising information about one or more links usable for connecting to one or more links in a different geographic region, and said updated information comprising at least said previous information and new information about one or more links for connecting to one or more links in said different geographic region.

The providing means may be for computing a rank for each link of said geographic region usable for connecting to one or more links of said different geographic region, determining for said each link if said computed rank has a lower importance than a previous computed rank for said link and if so, retaining the previous computed rank as the rank for said link.

The apparatus may comprise means for storing said updated information for said geographic region in association with map information for said geographic region.

A geographic area may be divided into at least said geographic region and said different geographic region, wherein said geographic region and said different geographic region are adjacent to each other and each of said geographic region and said different geographic region comprise at least one respective link usable to form a route between a first location in said geographic region and a second location in said different geographic region.

The apparatus may comprise means for using said updated information when determining a route between said geographic region and said different region or between a first location in said geographic region and a second location in said different region.

The new information may be in respect of one or more links different to those of said previous information and/or one or more links of the previous information where said one or more links of the previous information has changed.

The previous and updated information may comprise edge flag information.

The previous information and said updated information may comprise a vector indicating if said link is a desired path to a respective node of respective partitions of a region.

The previous information may comprise a previous vector and said updated information may comprise an updated vector, each value of said updated vector being one of the same or changed with respect to said previous vector to a value representing a higher ranking.

The previous information and said updated information may comprise link hierarchy information.

The updated information may be in a first link level and said previous information may be retained in said first link level.

Each of said links may have a link class associated therewith.

The apparatus may comprise means for applying a cost function to one or more of said links.

The cost function may be dependent on one or more of length associated with said link, speed associated with said link and one or more attributes of said link.

The one or more attributes may comprise one or more of tunnel and bridge.

The apparatus may comprise means for storing said previous information, means for compiling update region information for said region when said update region information has been updated and means for storing first information associated with said compilation; and means for providing said updated information from said previous information and said first information.

The apparatus may comprise means for carrying out an OR operation in respect of said previous and first information to provide said updated information.

The updated information may comprise said previous information and said first information.

According to an aspect, there is provided an apparatus comprising: at least one processor and at least one memory including computer program code, the at least one memory and the computer program code configured to, with the at least one processor, cause the apparatus at least to provide or receive updated information, previous and said updated information associated with a geographic region, said previous information comprising information about one or more links usable for connecting to one or more links in a different geographic region, and said updated information comprising at least said previous information and new information about one or more links for connecting to one or more links in said different geographic region.

The at least one memory and the computer program code may be configured to, with the at least one processor, cause the apparatus to compute a rank for each link of said geographic region usable for connecting to one or more links of said different geographic region, determine for said each link if said computed rank has a lower importance than a previous computed rank for said link and if so, retain the previous computed rank as the rank for said link.

The at least one memory and the computer program code may be configured to, with the at least one processor, cause the apparatus to store said updated information for said geographic region in association with map information for said geographic region.

A geographic area may be divided into at least said geographic region and said different geographic region, wherein said geographic region and said different geographic region are adjacent to each other and each of said geographic region and said different geographic region comprise at least one respective link usable to form a route between a first location in said geographic region and a second location in said different geographic region.

The at least one memory and the computer program code may be configured to, with the at least one processor, cause the apparatus to use said updated information when determining a route between said geographic region and said different region or between a first location in said geographic region and a second location in said different region.

The new information may be in respect of one or more links different to those of said previous information and/or one or more links of the previous information where said one or more links of the previous information has changed.

The previous and updated information may comprise edge flag information.

The previous information and said updated information may comprise a vector indicating if said link is a desired path to a respective node of respective partitions of a region.

The previous information may comprise a previous vector and said updated information may comprise an updated vector, each value of said updated vector being one of the same or changed with respect to said previous vector to a value representing a higher ranking.

The previous information and said updated information may comprise link hierarchy information.

The updated information may be in a first link level and said previous information may be retained in said first link level.

Each of said links may have a link class associated therewith.

The at least one memory and the computer program code may be configured to, with the at least one processor, cause the apparatus to apply a cost function to one or more of said links.

The cost function may be dependent on one or more of length associated with said link, speed associated with said link and one or more attributes of said link.

The one or more attributes may comprise one or more of tunnel and bridge.

The at least one memory and the computer program code may be configured to, with the at least one processor, cause the apparatus to store said previous information, to compile update region information for said region when said update region information has been updated and store first information associated with said compilation, and provide said updated information from said previous information and said first information.

The at least one memory and the computer program code may be configured to, with the at least one processor, cause the apparatus to carry out an OR operation in respect of said previous and first information to provide said updated information.

The updated information may comprise said previous information and said first information.

Any of the methods above may be performed by an apparatus.

A computer program comprising program code means adapted to perform the method may also be provided. The computer program may be stored and/or otherwise embodied by means of a carrier medium.

It should be appreciated that any feature of any aspect may be combined with any other feature of any other aspect.

BRIEF DESCRIPTION OF SEVERAL VIEWS OF THE DRAWINGS

Reference will now be made by way of example only to the accompanying drawings in which.

DETAILED DESCRIPTION OF THE INVENTION

In order to support incremental updating of specific regions, a database system is often divided into generally independent regions. These regions may for example be a country or a part of the country or have some geographic significance. In the context of for example NDS, these regions may be referred to update regions. These regions may then be updated separately from one another. The updating of regions in for example NDS will be described in more detail later.

A navigation database may be required to support long distance routing. For example, depending on the application of the database, it may be desirable to compute a distance between for example two cities in two different countries. These countries may be adjacent or separated from one another by one or more other countries. It is generally desirable that such a long distance route be computed in a relatively short period of time, for example of the order of a few seconds. Some navigation database providers, to deal with this requirement, may include pre-computed information into the database. This pre computed information is based on the complete database and does not take independent regions into account. This will be described in more detail later.

Figure 1A:
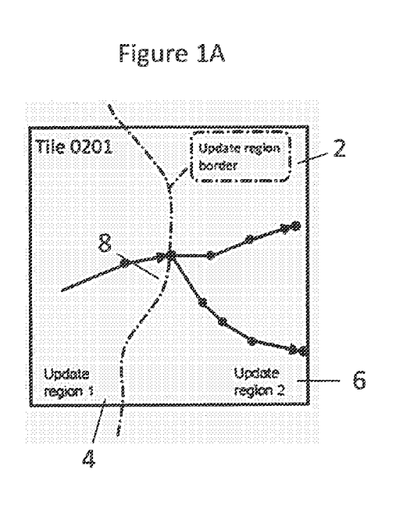
FIGS. 1A to C show an update region concept as for example provided by NDS.
Figure 1B:
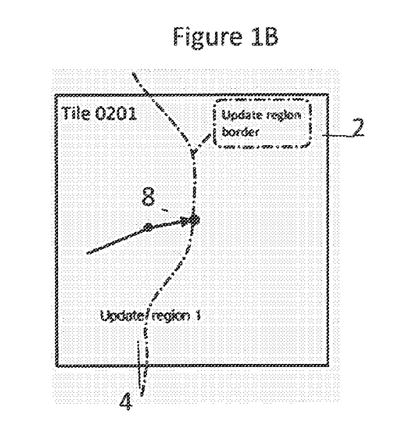
Figure 1C:
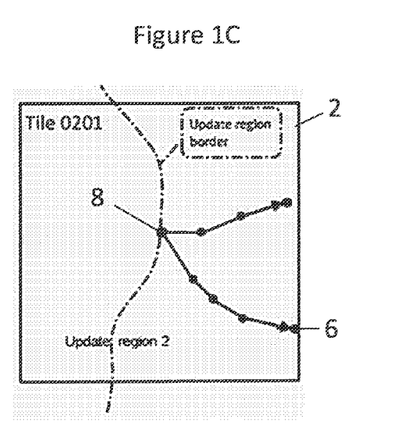

The update region concept will now be described in more detail with reference to FIGS. 1A to 1C. The update regions enable incremental and partial updating of defined geographic regions within the navigational database. The update region may represent a geographic area in the database which can be subject to an update. The database which complies with the NDS standard may be logically divided into update regions which are disjointed but which may overlap at defined points. These defined points may be gateways connecting update regions. Two or more update regions may is only overlap at borders. NDS divides up geographic areas into regular tiling areas. Accordingly, the update region borders generally do not coincide with tile borders. In this regard, reference is made to FIG. 1A which schematically shows a logical tile 2. This logical tile covers a border region. In particular, part of the tile is associated with a first region 4 and part of the tile is associated with a second region 6. These two regions would be updated separately. Accordingly, a logical tile, such as tile 2, which is over lapping borders, is therefore physically stored in each intersecting update region. In other words, tile 2 is stored once in relation to update region 1 and once in relation to update region 2. FIG. 1B shows the tile which is stored with respect to update region 1 and FIG. 1C shows the tile which is stored in relation to update region 2. As can be seen, the respective tile is filled only with the contents belonging to the corresponding update region. In other words, the tile 2 which is stored in relation to update region 1 will only contain the information of update region 1 whilst the tile 2 which is stored in relation to update region 2 will only contain the information in update region 2.

The road network between the two different update regions is connected via gateways. These gateways may be referred to as intersection gateways. In both update regions, the intersection of the border is stored with a stable identity. This is sometimes referred to as the "Gateway ID". The stable Gateway IDs allow routing from one update region to another. In the context of FIGS. 1A to C the Gateway intersection is referenced 8.

Figure 2A:
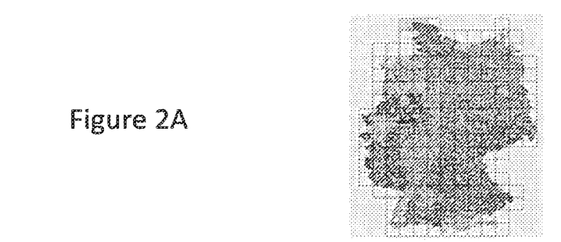
FIGS. 2A to C shows a method using pre-computed edge flags.
Figures 2B, 2C:
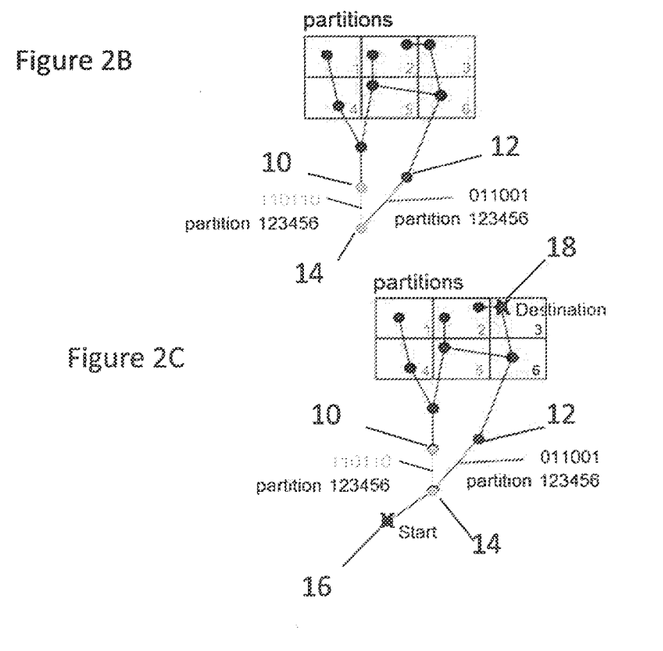

Reference is now made to FIGS. 2A to C which shows a first technique for providing pre-computed routing information into a navigation database during the navigation database compilation process. This information may be used to speed up routing in the target system. The approach illustrated in FIGS. 2A to C is one which uses a pre-computed edge flag information technique. As shown in FIG. 2A, an assumption is made that the database is divided into enumerated or numbered partitions. FIG. 2A shows a geographic area which is divided into the partitions.

Reference is made to FIG. 2B which schematically shows six partitions, each numbered 1 to 6. A bit vector is assigned to each edge indicating for each partition i whether this edge is on an optimal path from the starting node of the edge to any node within partition i. The grid number or the number of the partition will reflect the spatial position of the grid. It is assumed that there are n such partitions. To each link (or road), a two vectors each consisting of consisting of n bits is assigned. In the first bit vector, a "1" bit at position i indicates that this link is on optimal route starting from the reference node of the link to any destination in partition i. In the second bit vector, a "1" at a position i indicates that this link is on an optimal route starting from the non-reference node of the link to any destination in partition i. A routing algorithm, knowing that the destination is located in partition i, only has to explore those links for which the corresponding item is set. By using this edge information, a number of links can be pruned. In other words, the links which are pruned can be ignored, which speeds up the routing significantly.

With reference to FIG. 2B, for the link from a first node 14 to a second node 10, a vector would be 110110 meaning that this link is on an optimal route for a destination in partitions 1, 2, 4 and 5 (there being 6 partitions in the example of FIG. 2B). For the link from the first node 14 to a third node 12, a vector would be 011001 meaning that this link is on an optimal route for a destination in partitions 2, 3 and 6. Consider FIG. 2C, a starting point 16 is provided and the destination 18 is provided in partition 3. For this journey, the route via node 10 can be pruned as the vector does not have a "1" at the position associated with partition 3. In other words, there is not an optimal route to partition 3 via node 10. Graph algorithms such as Dijkstra or A* may be arranged to use this edge information.

Figure 3:
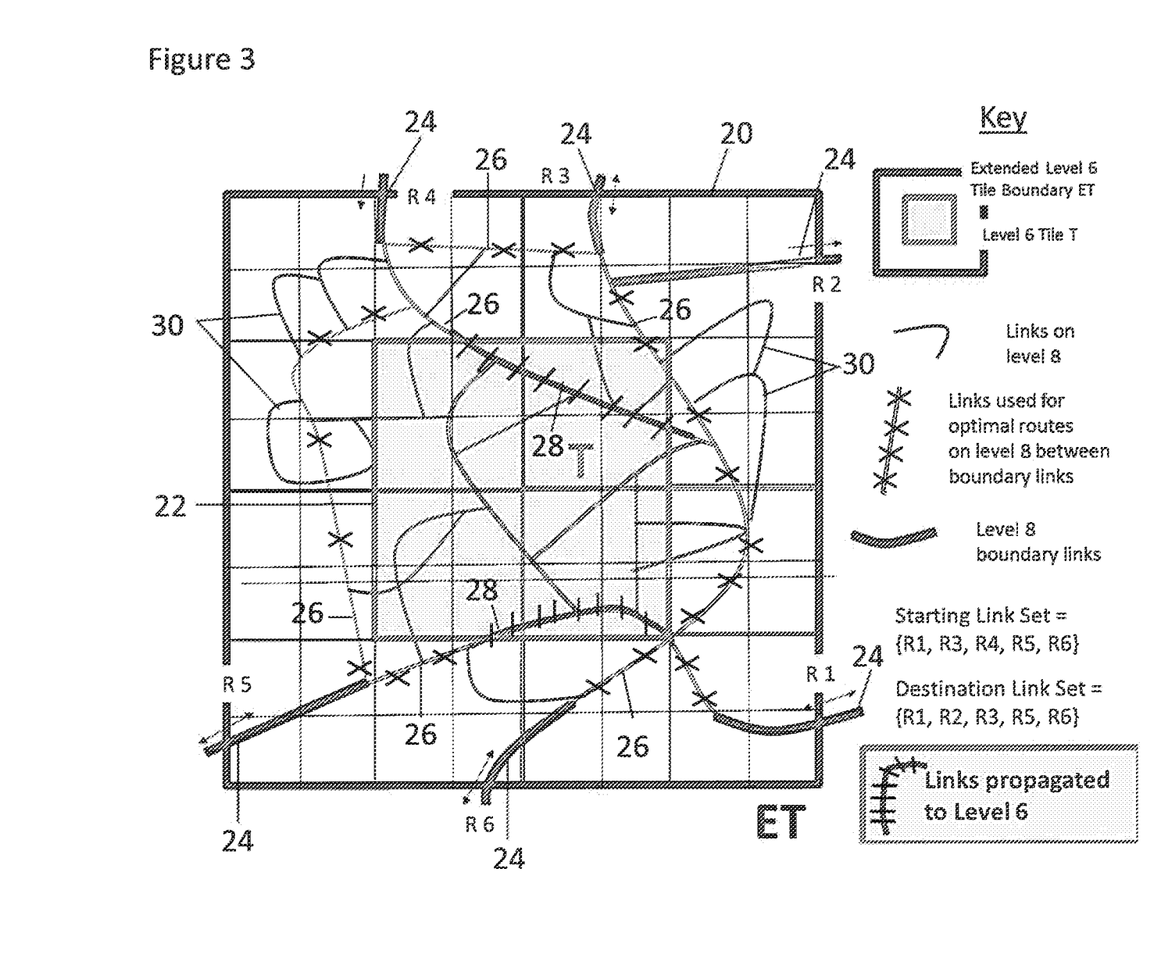
FIG. 3 shows a method of routing using hierarchical links.

Another approach for speeding up routing is illustrated in relation to FIG. 3 and uses a set of hierarchical links. In NDS, a number of different layers are provided. The high level layers may comprise only the more important links whilst the lower levels would include more of the links. The structure is hierarchical which means that a lower level will include all of the links of the previous layer and one or more additional links. The lowest level would usually contain all the links.

To illustrate one embodiment, an example where five different layers are used is considered. The five different layers may be referred to as level 13, 10, 8, 6 and 4. It should be appreciated that the number of layers used may be or more or less than 5 in some embodiments. The number of layers available may be more or less than 13.

In this example, the most detailed layer may be considered to be at level 13 is which contains all roads. The layers on for example levels 10, 8, 6 and 4 may then contain only the important roads. The layer on level 4 may contain the most important roads only.

One approach to get to such a layering is to use a functional road class value. This value may be assigned manually, algorithmically or in any other suitable manner. The FRC value may reflect the importance of the road. The FRC values may be in accordance with the administrative road classes which are defined by local authorities. In Germany, an FRC-Value of 1 may be assigned to Motorways, 2 to State Roads, etc. . . . . However, such an approach may not provide an optimal route for a given cost function. To achieve optimisation of the routing, an algorithm may be required which computes the layering for the specific cost functions. A cost function c for a link l could be c(L)=length (L) or c(L)=length(L)*averageSpeed(L) or the like. The cost function may depend on the length of a link and/or the speed category of this link and may optionally take into consideration attributes such as tunnels, bridges, or the like.

In FIG. 3, links distributed to level 6 may be computed as follows. The outer boundary 20 shown in FIG. 3 represents the extended level 6 tile boundary 20. The inner boundary 22 represents the level 6 tile T. Thus, for each level 6 tile T, a boundary link of its extension tile ET is determined. The extension ET boundary may be computed by adding a level 7 tile to each side of the tile T, as shown in FIG. 3. The boundary links of the extended tile ET are those of the level 8 links which cross the border of the extended tile ET. These level 8 links are each referenced 24. These links 24 can be divided into for example two sets. For example, the links can be divided into a starting link set and a destination link set. The starting link set may contain all boundary links heading into the ET and the destination boundary set may contain all links heading out of the ET 20. Bidirectional boundary links may be assigned to both sets. Based on these two sets, the optimal routes from all links in the starting boundary set to all links the destination boundary set can be computed. These may be optimal routes. The optimal routes may be based on the level 8 links contained in the extended tile. All level 8 links of the tile T which are part of an optimal route may be propagated to level 6. Thus, only those links which are part of an optimal route where the start and destination link are at least a level 7 the away from the link are contained in level 6. The final set of level 6 links for a tile T consists of all level 8 links which are on an optimal route from any level 8 starting boundary link to any level 8 destination boundary link of the extended tile.

In the arrangement shown in FIG. 3, the level 8 boundary links 24 are referenced R1 to R6. As all of the links except R4 and R2 are bidirectional, the starting link set comprises R1, R3, R4, R5 and R6. The destination link set comprises R1, R2, R3, R5 and R6. The links used for optimal routes on level 8 between the boundary links are referenced 26. As can be seen, there are links 30 on level 8 which are not part of the level 8 boundary links nor part of the level 8 links used for optimal routes on level 8 between boundary links. As can be seen, there are some links which referenced 28 which are propagated to level 6. These links effectively are part of the optimal routes on level 8 between the boundary links but which are within the tile T and are thus propagated to level 6.

Figure 4A:
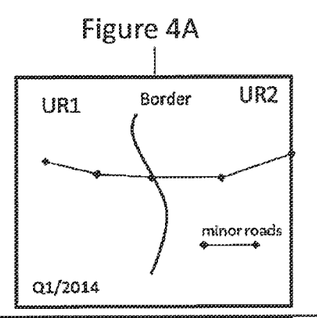
FIGS. 4A to H illustrate a problem with the updating of update regions which have pre-computed global routing information.
Figures 4B, 4D, 4E:
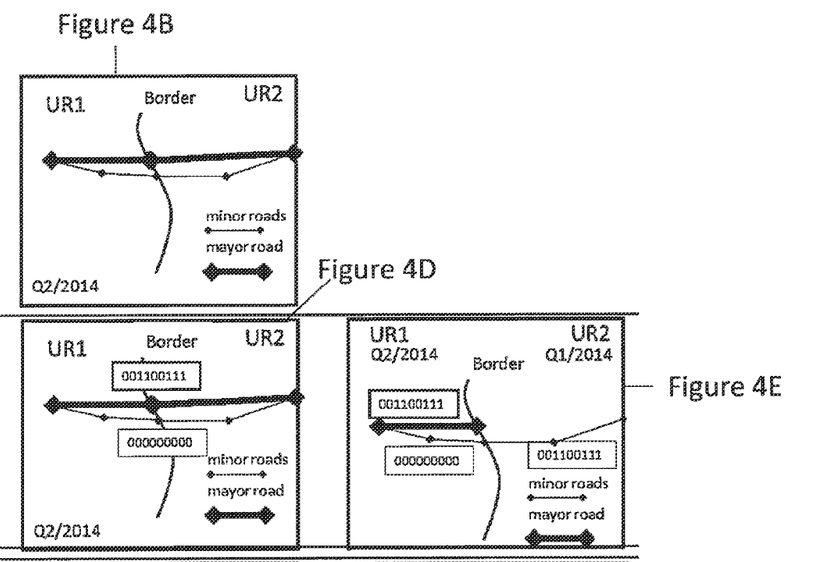
Figure 4C:
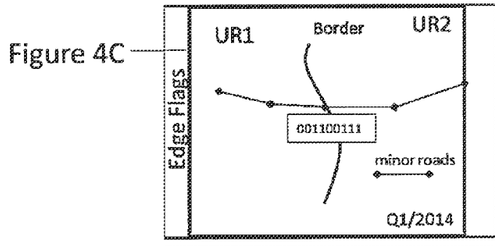
Figure 4F:
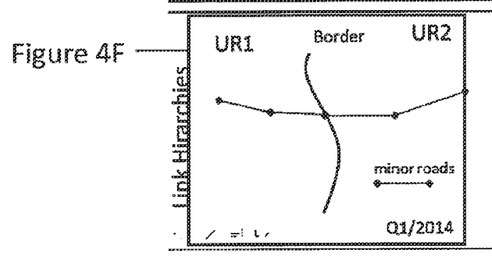
Figure 4G:
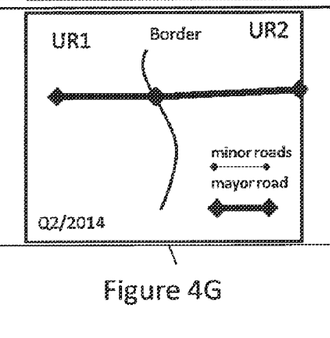
Figure 4H:
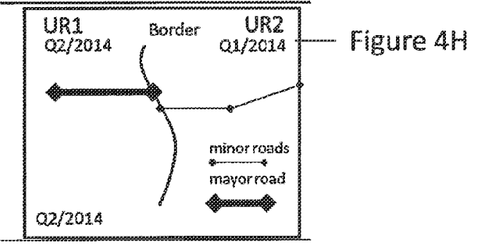

Reference will now be made to FIG. 4A to H which illustrate a problem which may be addressed by some embodiments. In particular, FIG. 4A or 4H illustrates a problem which may occur with computing routing information if a first update region UR1 is updated but not an adjacent update region UR2. Consider the initial case in FIG. 4A. The first update region UR1 and the second update region UR2 are connected via some minor roads in Q1/2014.

FIG. 4B shows an updated situation where update region UR1 and update region UR2 become connected by a new major road in Q2/2014.

FIG. 4C shows the edge flags corresponding to the situation shown in FIG. 4A, that is Q1/2014. In this example, all links might have the same edge flag bit vector indicating that the links are used for some optimal routes into some regions. By way of example, the bit vector may be 001100111.

In FIG. 4D, the situation in Q2/2014 is shown assuming that both update regions have been updated. It is shown that the edge flag vector for the minor roads are now contains only zero values indicating that the links are not part of an optimal route to any of the edge vector partitions. All optimal routes between the two regions are now using the new motorway and the edge vector of this new major road link is now the same as the previous edge links associated with the minor roads.

Consider the situation shown in FIG. 4E. In particular, update region UR1 has been updated to reflect the new road. However, update region UR2 has not yet been updated and includes the information of Q1/2014. As shown in FIG. 4E, a route is planned starting from starting point S in the first update region UR1 to a destination which is contained in the partition marked 1 in the new edge flag vectors. In other words, the respective bit in the vector is "1". It would be desirable to use the new major route in update region UR1 but this would not be extendable into the route of update region UR2 (because this update region has not yet been updated). The former minor road route in UR1 would not be considered any more as they are now associated with a zero value in the edge flag vectors for the destination area. Accordingly, it would not be possible to find an optimal route using edge flags in this situation.

Reference will now be made to FIGS. 4F to 4H which show the problem which arises with the layer approach. Again, FIG. 4F shows the situation in Q1/2014 where the route between update region UR1 and update region UR2 is via minor roads only. FIG. 4G shows the situation in Q2/2014 where a major road now links up update region UR1 and update region UR2. In the arrangement shown in FIG. 4F, the minor roads are propagated to the higher routing layers because they are relevant for long-distance routing. In Q2/2014, only the new major links are propagated to the high routing level as the minor roads are no longer important for long-distance routing. Optimal routing would now use the major links. However, considered the situation in illustrated in FIG. 4H where update region UR1 has been updated but update region UR2 has not yet been updated. As can be seen, the links on the higher layers will now not be connected. Update region UR1 will have the major road whilst update region UR2 will have the minor routes. Accordingly, it would not be possible to find an optimal route using these higher layers in the two different regions.

Some embodiments may provide for the incremental updating of individual update regions. Some embodiments may use pre-computed routing information.

Reference will now be made to FIGS. 5A to 5H which shows some embodiments. Some embodiments may address all avoid the problems previously described. Some embodiments may allow for the individual updating of different update regions while still allowing optimal routes to be found.

Embodiments may be used with pre-computed routing information. That could pre-computed routing information may be any suitable information and for example may use the edge flag approach previously described and/or the link hierarchy approach.

Figure 5A:
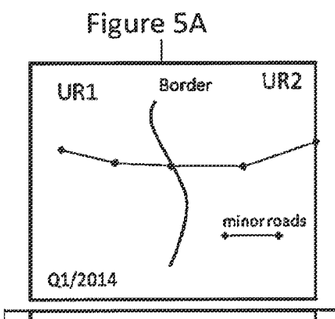
FIGS. 5A to H illustrate embodiments.
Figures 5B, 5D, 5E:
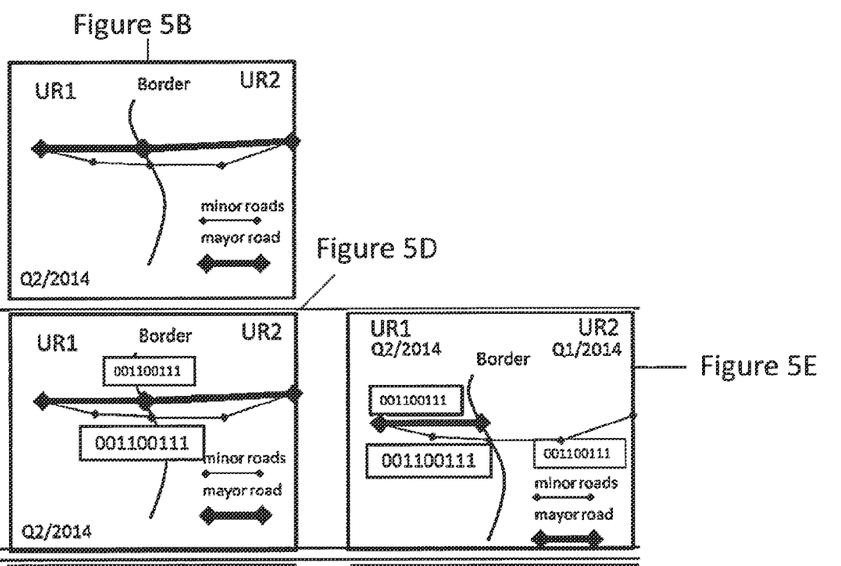

It should be appreciated that FIGS. 5A and 5B illustrate the same scenario as FIGS. 4A to 4B. In particular, FIG. 5A shows a situation in Q1/2014 where two update regions UR1 and UR2 are separated by a border and the two update regions are linked by minor roads.

FIG. 5B shows the situation in Q2/2014 where a new major road has been provided linking the two update regions UR1 and UR2 across the border region.

Figure 5C:
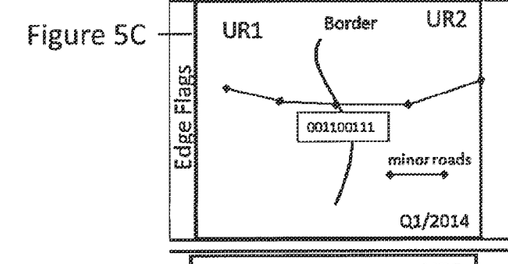

Reference will now be made to FIGS. 5C, 5D and 5E which illustrate embodiments in the context of arrangements which use the edge flag approach. Again, FIG. 5C is the same as in FIG. 4C. Consider FIG. 5D. In Q2/2014, with the presence of the major road, the edge flags on the road network containing the new major roads would be as follows: the edge flags the new major road would be 001100111 and the edge flags for the minor road would be 000000000.

In some embodiments a monotonically increasing edge flag may be used. With this, a bit in an edge flag vector does not toggle from "1" to "0", it allows for the bits to increasingly toggle from 0 to 1. In the example given, this means that the minor roads in Q2/2014 still keep the edge vector 001100111. In other words, both the minor road and the major roads keep the same edge vector. In some embodiments it is only possible that a bit value increases, i.e. that the value is changed from 0 to 1 in the new database. The value may be prevented from decreasing from 1 to 0. For example, a link has at position i a value of 1. In the next update, a compilation is run again and the outcome of this computation would be that the value should be 0 at position i. In some embodiments, the value "1" is retained and is not changed to 0. Thus, a bit value a certain position may increase but not decrease in some embodiments.

Consider the scenario shown in FIG. 5E where the update region UR1 is updated but update region UR2 is not updated. Optimal routing may now be found from starting point S in update region UR1 Both the old minor and the new major road would be expanded and as the minor road is connected to UR2, the optimal route could still be found. In UR1, both the minor and the major roads would be expanded during routing. The major road is expanded unnecessarily in the scenario shown in FIG. 5E but takes into account the uncertainty as to whether update region UR2 has been updated or not.

Figure 5F:
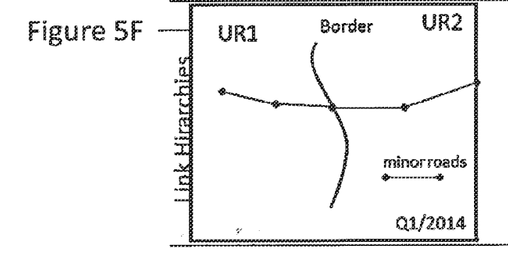
Figure 5G:
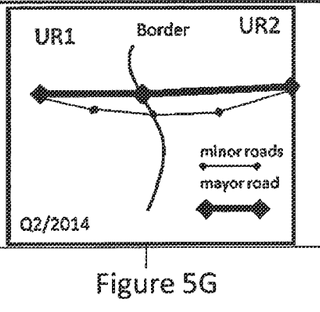
Figure 5H:
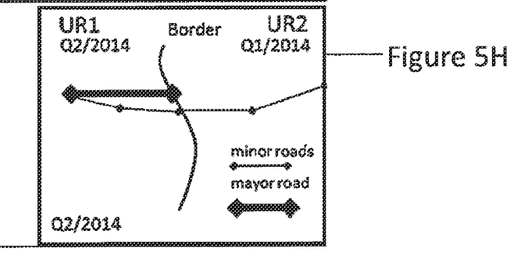

Reference is made to FIGS. 5F to 5H which shows application of embodiments using the link hierarchy approach. FIG. 5F corresponds to that shown in FIG. 4F. With the previous approach, if the link hierarchy for Q2/2014 is compiled, the minor roads would not be included, as illustrated in FIG. 4G. However, as shown in FIG. 5G, in embodiments, a link which is in an older database at a certain link level would be retained at that level and not stored in the lower link level later on. In some embodiments, this would mean that the minor roads in Q2/2014 are stored at the same link level that they were stored in Q1/2014. Thus, as can be seen from FIG. 5G, both the minor and major roads are stored at this link level now. If only update region UR1 is updated, then the situation shown in FIG. 5H is obtained. Accordingly, any route computation, with a starting point S in update region UR1 to any destination in update region UR2 will find an optimal route as the minor routes are connected to each other even if the major road is not yet included in update region UR2.

Some embodiments may have the advantage that the individual update of update regions is possible. Some embodiments allow the usage of pre-computed routing information.

In some embodiments the results of database compilations may be stored in a database or memory map. For example, the data from a previous compilation, e.g. for Q1/2012 is stored in for example a table in a relational database.

For edge flags such a relation may be OldEdgeFlags (PermanentLinkID, Direction, EdgeVector). In such a table, all the links for the Q1/2014 compilation could be stored.

The pre-compilation of the routing network for the data of the new quarter Q2/2014 may then be performed. The results may be stored in a new table TempNewEdgeFlags (PermanentLinkID, Direction, Edge Vector). In order to create the final table NewEdgeFlags (PermanentLinkID, Direction, Edge Vector), the following may be carried out using the following procedure described in (pseudo) SQL.

```
INSERT INTO NewEdgeFlags
    SELECT * FROM NewTempEdgeFlags UNION
    SELECT * FROM OldEdgeFlags WHERE PermanentLinkID
NOT IN (SELECT PermanentLinkID FROM NewTempEdgeFlags);
    UPDATE  NewEdgeFlags  N,
    OldEdgeFlags   O   SET N.EdgeVector  =(
N.EdgeVector     BITOR         O.EdgeVector)     WHERE
N.PermanentLinkID=O.PermanentLinkID AND N.Direction=O.Direction;
```

```
DELETE OldEdgeFlags;
    INSERT INTO OLdEdgeFlags SELECT * FROM NewEdgeFlags;
```

The table NewEdgeFlags will contain the final results for the Q2/2014 compilation. T The edge vectors may be computed by computing their values with the new Q2/2014 data and then apply an OR operation on a bit level with the edge vectors used in Q1/2014. This OR-Operation on bit level guarantees that bits can never go down from value 1 to value 0 in a new compilation, rather, the bits can only go up from value 0 to value 1. The new result is stored in the old table so that it is available for the compilation of the Q3/2014 data.

For the link hierarchy the situation may be similar.

The results of the former table are stored in a relation OldLinkHierarchy (PermanentLinkID, Level) (contrary to the situation with edge flags, it is not required to store the directions as the link is propagated to higher levels as soon as it is required for one direction). Then the link hierarchy computation is carried out with the new data and the result is stored in an intermediate table TempNewLinkHierarchy (PermanentLinkID, Level). In order to create the final table NewLinkHierarchy (PermanentLinkID, Level), the following approach again expressed in (pseudo) SQL may be carried out.

```
INSERT INTO NewLinkHierarchy
    SELECT * FROM NewTempLinkHierarchy UNION
    SELECT * FROM OldLinkHierarchy WHERE PermanentLinkID
NOT IN (SELECT PermanentLinkID FROM NewTempLinkHierarchy);
    UPDATE NewLinkHierarchy N,
OldLinkHierarchy O SET N.Level =
max(N.Level,O.Level) WHERE N.PermanentLinkID=
O.PermanentLinkID;
    DELETE OldLinkHierarchy;
    INSERT INTO OLdLinkHierarchy SELECT * FROM
        NewLinkHierarchy;
```

The MAX-operator ensures that a link is never stored on a lower level, even if this were the result of the new compilation. Thus it may be guaranteed an optimal route on a certain level can be found even if only one of two update regions is updated.

Some embodiments may allow for the individual update of update regions.

Usage of pre-computed routing information may be possible in some embodiments.

Some embodiments may use the concept of update regions and pre-computed routing information.

Some embodiments may use information from "old" compilations in addition to the pre-computational information of the "new" compilation to create the new database containing pre-computed routing information.

Some embodiments may applying an OR operation on bit-level for edge flag-based routing approaches.

Some embodiments may apply the MAX Operator for the link levels of hierarchical routing approaches.

Figure 6:
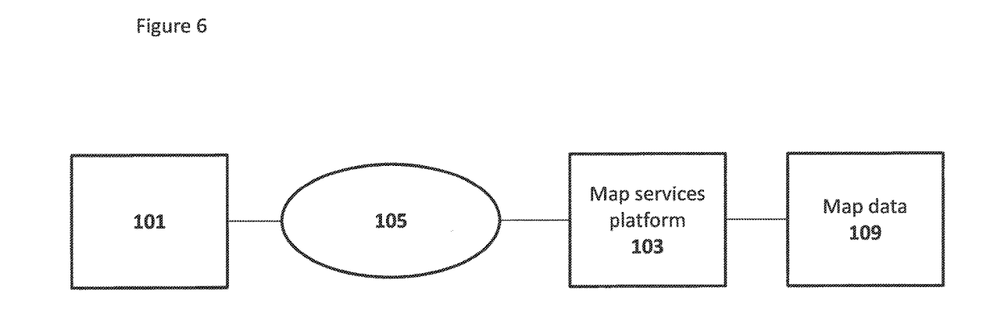
FIG. 6 shows a system in which embodiments may be provided.

Reference is made to FIG. 6 which schematically shows a system in which some embodiments may be provided. The system comprises user equipment 101 capable of using mapping services. Map information required by the user equipment may be received from a map services platform 103 via a communication network 105. A map database 109 is provided which holds map data. This map data may comprise data for one or more update regions and the pre-computed routing information as described above. In this embodiment, mapping services are provided to a user equipment 101 by the map services platform 103.

The navigation device may be a stand-alone device or apparatus and accordingly have the required map information stored on the device or apparatus itself.

Figure 7:
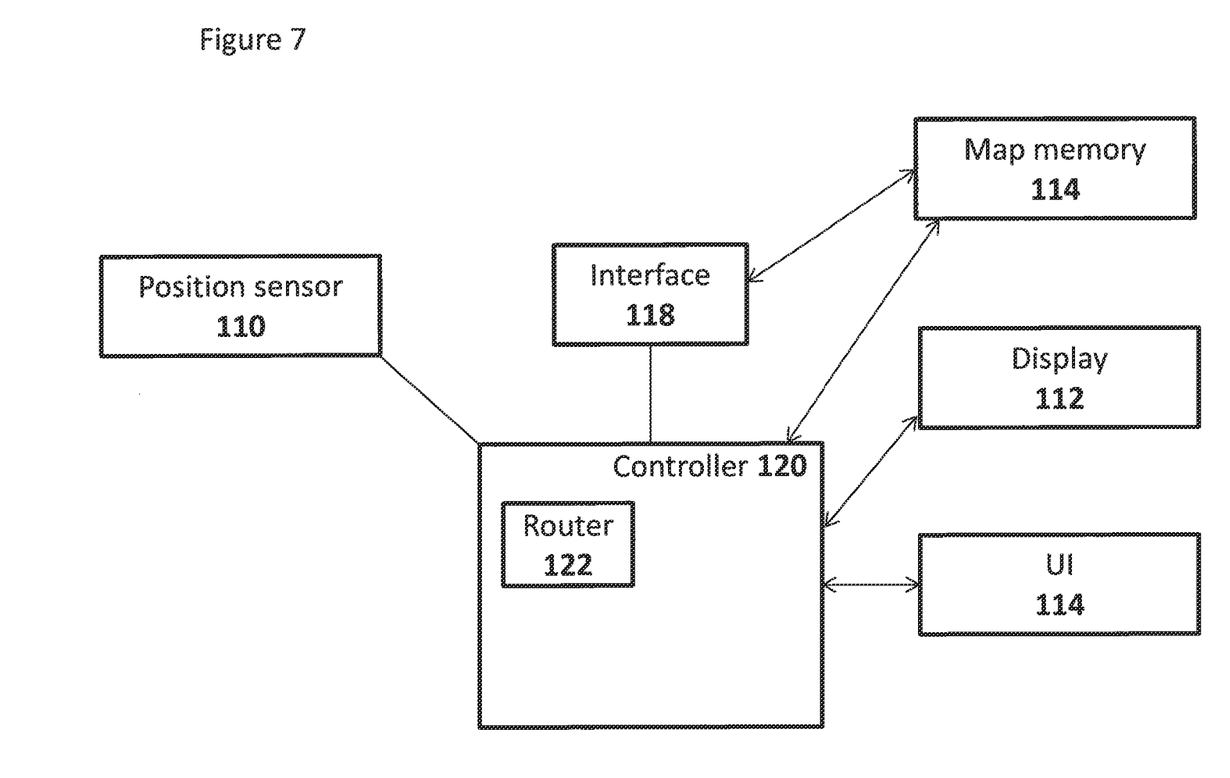
FIG. 7 shows schematically apparatus of some embodiments.

Reference is made to FIG. 7 which shows an apparatus with which embodiments may be used. The apparatus comprises a position sensor 110. The position sensor may comprise a sensor which can obtain information about the location of the apparatus. By way of example only, the position sensor may be a satellite positioning sensor such as a global positioning system (GPS) sensor, an assisted global positioning system (assisted-GPS) sensor or any other suitable satellite positioning sensor. It should be appreciated that the apparatus may alternatively or additionally obtain position information in any other suitable manner, for example from a base station or the like.

The apparatus comprises a controller 120. The controller 120 comprises at least one processor, in some embodiments. The controller 120 may comprise a router function 122 which is able to compute or calculate a desired route.

A user interface UI 114 is provided. The user interface 114 allows the user to, for example, select a destination and/or starting point.

The apparatus comprises a display 112. The display 112 may be configured to display map information, such as a route and/or area map. In some embodiments, the display may be a touchscreen and accordingly provide all or part of the UI function.

A map memory 114 is provided which is configured to store map information. This map information may comprise one or more of at least part of an update region and/or pre-computed routing information. The map memory may be provided by one or more memories.

An interface 118 is provided. In the case of example of a user device configured to work with a mapping services platform, the interface 118 would allow the device to communicate with for example communications network 105. It should be appreciated that in other embodiments, the interface may be provided to allow a stand-alone device to be updated using any suitable method or apparatus. In some embodiments, updated map information may be provided to the interface 118 and stored in the map memory 114.

The router 122 may use for example information on a current position from the position sensor 110, information on a required route and information stored in the map memory to compute a desired route. The desired route may be displayed on for example the display 112.

In some embodiments, at least part of the routing calculation provided by router 122 may be provided in the map services platform 103.

Figure 8:
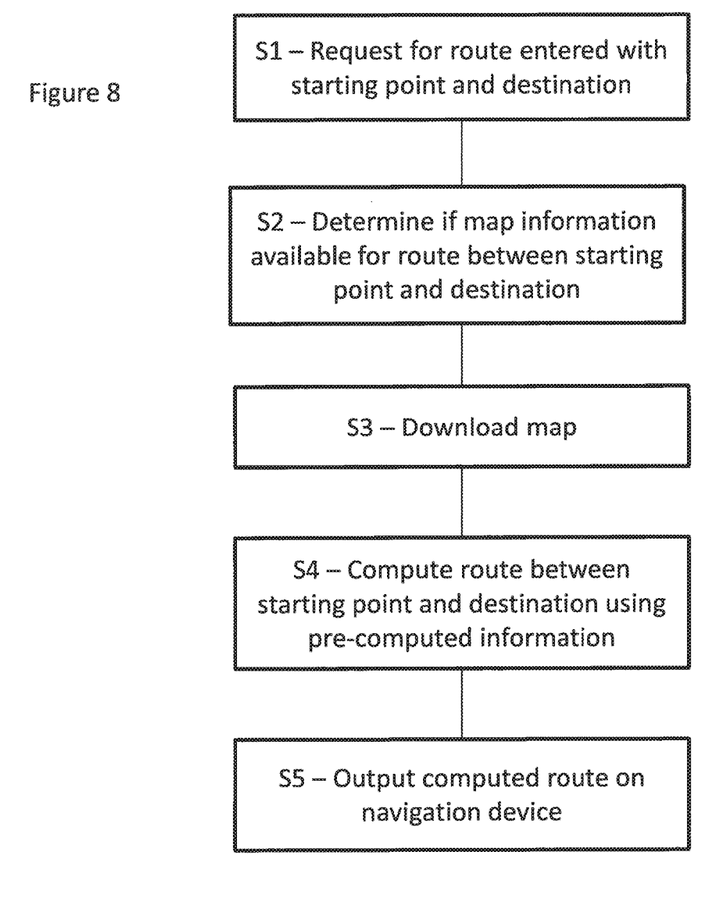
FIG. 8 shows a flow of a method using pre-computed routing information.

Reference is made to FIG. 8 which shows a method.

In step S1, a request for a route is entered. This route may have a starting point and destination. For example, the starting point may be input or may be assumed to be the current position of the apparatus.

In step S2, it is determined that information is available for a route between the starting point and destination.

In step S3, the map information is downloaded if required. This may be from the map database 109 via for example the map services platform 103. It should be appreciated that in some embodiments, step S2 and S3 may be at least partially omitted. Where the apparatus is part of a stand-alone device, steps S2 and S3 may be completely omitted.

In step S4, a route is computed between the starting point and destination using the pre-computed information, as previously discussed.

In step S5, the computed route is output from the navigation device. This output may comprise the display of at least part of the route on the display and/or any other suitable output such as an audio output.

Figure 9:
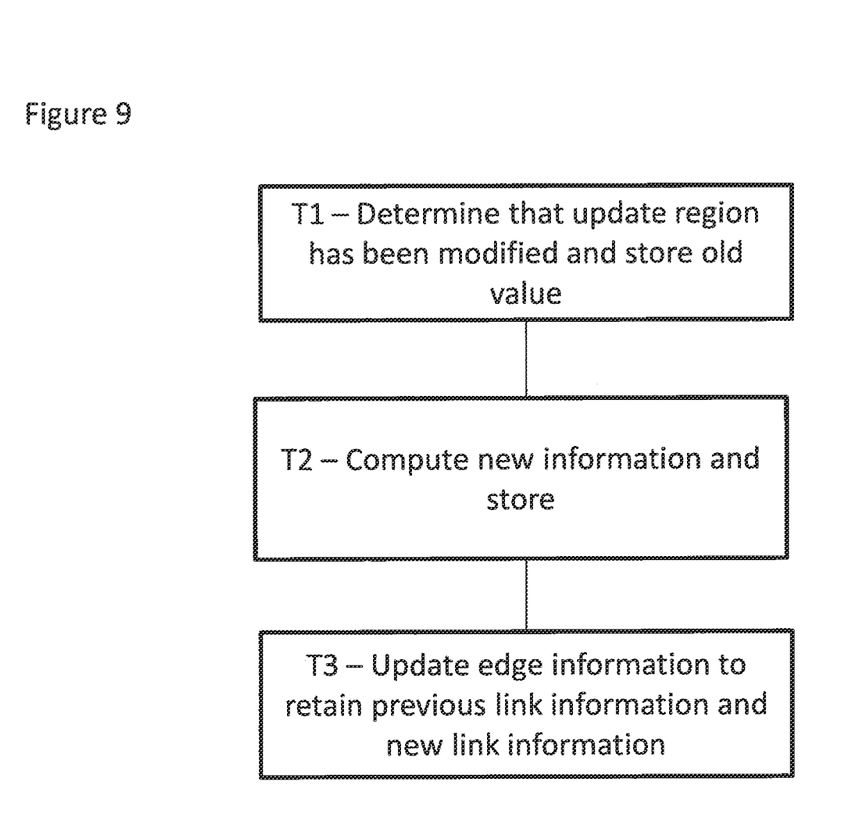
FIG. 9 shows a flow of a method for determining pre-computed routing information.

Reference is made to FIG. 9 which shows a method flow of some embodiments.

In step T1, a determination is made that an update region has been modified, particularly in the border region and the old data is stores, for example in a table.

In step T2, the new update region is compiled and stored for example in a second table.

In step T3, the edge information is updated to effectively retain the previous and new information or at least part of the previous information as described previously. This may be by carrying out an OR operation in respect of the old and new tables, where edge flags are used. This may be applying a MAX operator where link levels are used.

It should be appreciated that in alternative embodiments may be used with other methods of pre-computed routing information.

It should be appreciated that the embodiment is shown in FIG. 5 and the situation outlined is by way of example and of course embodiments may be used in any other suitable scenario.

Embodiments have been described in relation update regions. It should be appreciated that other embodiments may be used in any other scenario where two adjacent areas or regions may be subject to updates at different times.

In some embodiments, link importance from one release to another release is not downgraded even if the pre-computed routing algorithm wants to. The link importance is reflected by the 1-values in the edge flag vector or the highest level the link is stored in. In other word, for any link a bit is never reduced from a 1-value to a 0-value. In the hierarchical approach, the maximum level at which the link is stored in is never reduced.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the may be implemented in hardware, while other aspects may be implemented in firmware or software which may be executed by a controller, microprocessor or other computing device, although embodiments are not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
providing or receiving updated information, previous and said updated information associated with a geographic region, wherein said previous information and updated information comprise edge flag information, said previous information comprising information about one or more links usable for connecting to one or more links in a different geographic region, and said updated information comprising at least said previous information and new information about one or more links for connecting to one or more links in said different geographic region;
generating an update for the geographic region comprising the updated information; and
causing the update for the geographic region to be stored in a navigational database.

2. The method as claimed in claim 1, wherein said providing comprises:
computing a rank for each link of said geographic region usable for connecting to one or more links of said different geographic region;
determining for said each link if said computed rank has a lower importance than a previous computed rank for said link; and
if so, retaining the previous computed rank as the rank for said link.

3. The method as claimed in claim 1, comprising storing said updated information for said geographic region in association with map information for said geographic region.

4. The method as claimed in claim 1, wherein a geographic area is divided into at least said geographic region and said different geographic region, wherein said geographic region and said different geographic region are adjacent to each other and each of said geographic region and said different geographic region comprise at least one respective link usable to form a route between a first location in said geographic region and a second location in said different geographic region.

5. The method as claimed in claim 1, further comprising: using said updated information when determining a route between said geographic region and said different region or between a first location in said geographic region and a second location in said different region.

6. The method as claimed in claim 1, wherein said new information is in respect of one or more links different to those of said previous information and/or one or more links of the previous information where said one or more links of the previous information has changed.

7. The method as claimed in claim 1, wherein said previous information and said updated information comprises a vector indicating if said link is a desired path to a respective node of respective partitions of a region.

8. The method as claimed in claim 7, wherein said previous information comprises a previous vector and said updated information comprises a updated vector, each value of said updated vector being one of the same or changed with respect to said previous vector to a value representing a higher ranking.

9. The method as claimed in claim 1, wherein said previous information and said updated information comprises link hierarchy information.

10. The method as claimed in claim 9, wherein said updated information is in a first link level and said previous information is retained in said first link level.

11. The method as claimed in claim 1, wherein each of said links has a link class associated therewith.

12. The method as claimed in claim 1, further comprising: applying a cost function to one or more of said links.

13. The method as claimed in claim 12, wherein said cost function is dependent on one or more of length associated with said link, speed associated with said link and one or more attributes of said link.

14. The method as claimed in claim 1, further comprising: storing said previous information, compiling update region information for said region when said update region information has been updated and storing first information associated with said compilation, and providing said updated information from said previous information and said first information.

15. The method as claimed in claim 14, further comprising: carrying out an OR operation in respect of said previous and first information to provide said updated information.

16. The method as claimed in claim 14, wherein said updated information comprises said previous information and said first information.

17. An apparatus comprising at least one processor and at least one memory including computer program code, the at least one memory and the computer program code configured to, with the at least one processor, cause the apparatus at least to:
provide or receive updated information, previous and said updated information associated with a geographic region, wherein said previous information and updated information comprise edge flag information, said previous information comprising information about one or more links usable for connecting to one or more links in a different geographic region, and said updated information comprising at least said previous information and new information about one or more links for connecting to one or more links in said different geographic region;
generate an update for the geographic region comprising the updated information; and
cause the update for the geographic region to be stored in a navigational database.

18. The apparatus as claimed in claim 17, wherein the at least one memory and the computer program code are configured to, with the at least one processor, cause the apparatus to compute a rank for each link of said geographic region usable for connecting to one or more links of said different geographic region, determine for said each link if said computed rank has a lower importance than a previous computed rank for said link and if so, retain the previous computed rank as the rank for said link.

19. The apparatus as claimed in claim 17, wherein the at least one memory and the computer program code are configured to, with the at least one processor, cause the apparatus to store said updated information for said geographic area in association with map information for said geographic area.

* * * * *

UNITED STATES PATENT AND TRADEMARK OFFICE
CERTIFICATE OF CORRECTION

PATENT NO. : 9,709,407 B2
APPLICATION NO. : 14/655453
DATED : July 18, 2017
INVENTOR(S) : Pfeifle Page 1 of 1

It is certified that error appears in the above-identified patent and that said Letters Patent is hereby corrected as shown below:

On the Title Page

Item (73) Assignee: "Nokia Technologies Oy, Espoo (FI)" should read --HERE Global B.V., Eindhoven (NL)--.

Signed and Sealed this
First Day of May, 2018

Andrei Iancu
*Director of the United States Patent and Trademark Office*